United States Patent [19]

Koba

[11] Patent Number: 5,669,728
[45] Date of Patent: Sep. 23, 1997

[54] BRACKET FOR A STRUT OF A VEHICLE SUSPENSION AND CONNECTING STRUCTURE THEREOF TO CONNECT SUCH A BRACKET AND A SHOCK ABSORBER

[75] Inventor: Hiroyuki Koba, Toyota, Japan

[73] Assignee: Toyota Jidosh Kabushiki Kaisha, Aichi-Ken, Japan

[21] Appl. No.: 510,097

[22] Filed: Aug. 1, 1995

[30] Foreign Application Priority Data

Aug. 25, 1994 [JP] Japan ................... 6-201014

[51] Int. Cl.⁶ .................................................. B60G 7/00
[52] U.S. Cl. .................. 403/270; 188/322.19; 248/230.1; 280/688
[58] Field of Search ............ 188/322.19; 248/219.2, 248/230.1; 280/96.1, 673, 688, 690; 403/234, 237, 265, 270

[56] References Cited

U.S. PATENT DOCUMENTS

| | | | |
|---|---|---|---|
| 560,998 | 5/1896 | Johnson | 403/265 X |
| 3,893,702 | 7/1975 | Keijzer et al. | 280/701 |
| 5,145,204 | 9/1992 | Perkins | 280/673 X |
| 5,423,403 | 6/1995 | Handke et al. | 280/96.1 X |

FOREIGN PATENT DOCUMENTS

| | | |
|---|---|---|
| 0083669 | 7/1983 | European Pat. Off. . |
| 0108041 | 5/1984 | European Pat. Off. . |
| 3017737 | 12/1980 | Germany . |
| 57-98910 | 6/1982 | Japan . |
| 2-16808 | 2/1990 | Japan . |
| 2-126908 | 10/1990 | Japan . |
| 16083 | 6/1903 | United Kingdom ......... 248/230.1 |
| 2050968 | 1/1981 | United Kingdom . |
| 2127936 | 4/1984 | United Kingdom . |
| 2187532 | 9/1987 | United Kingdom ......... 188/322.19 |
| 2243585 | 1/1991 | United Kingdom . |

*Primary Examiner*—Blair Johnson
*Assistant Examiner*—Andrea Chop
*Attorney, Agent, or Firm*—Oliff & Berridge

[57] ABSTRACT

A bracket made from a metal sheet for connecting a strut of a suspension and a wheel carrier has at least two attaching portions attached to the wheel carrier. A holding portion holds the strut at a predetermined position, and at least one welding portion substantially exactly surrounds the predetermined position of the strut and is welded to the strut.

18 Claims, 4 Drawing Sheets

FIG. 8
FIG. 7
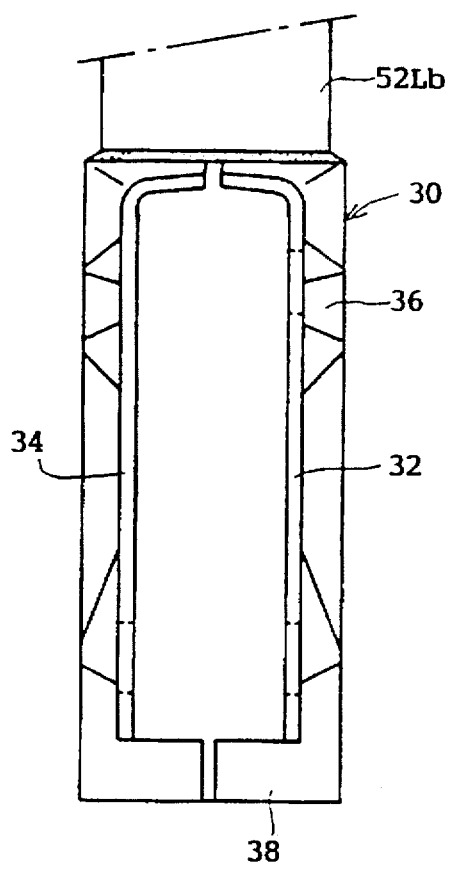
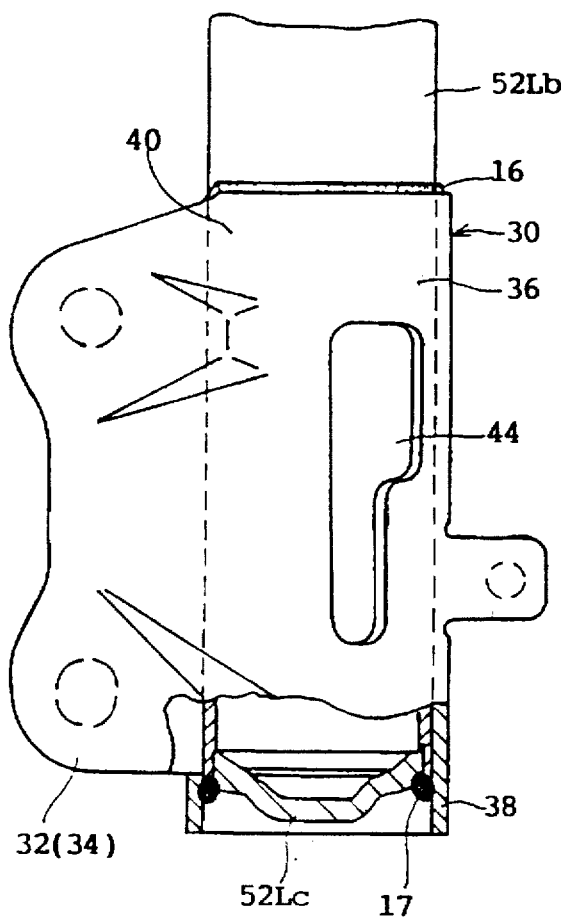

5,669,728

BRACKET FOR A STRUT OF A VEHICLE SUSPENSION AND CONNECTING STRUCTURE THEREOF TO CONNECT SUCH A BRACKET AND A SHOCK ABSORBER

BACKGROUND OF THE INVENTION (1) Field of the Invention

The present invention generally relates to a bracket for a strut of a suspension for an automobile and, more particularly, to a bracket connecting a strut of a suspension system of an automobile and a wheel carrier.

(2) Description of the Related Art

Conventionally, as a connecting structure of a strut of a suspension of an automobile and a wheel carrier, a structure using a bracket which connects the strut and the wheel carrier has been known.

The structure discussed above is widely used for connecting a shock absorber and a wheel carrier. The bracket used in the structure is ordinary manufactured by pressing two thin flat metal plates so that a portion attached to a wheel carrier and a portion holding a shell of a shock absorber are formed.

However, to lighten the weight and lower the cost of the bracket, it is preferable that the bracket is made by pressing a thin flat metal plate. In Japanese Laid-open Utility Model Application No. 2-126908, a bracket is disclosed which connects a strut of a suspension and a wheel carrier and is made from a thin flat metal plate.

FIG. 1 shows a front view of the bracket and a lower edge portion of an absorber shell. FIG. 2 shows a bottom view of the bracket. As shown in FIG. 1 and FIG. 2, the conventional bracket 10 has two extended portions 12, 14 formed from peripheral side sections of a thin flat metal plate. Further, the bracket 10 has a holding portion 16 formed from the interior section of the two extended portions 12, 14.

As can be seen in FIG. 2, the bracket 10 is formed from a single piece of sheet metal material. The holding portion 16 is semi-circular and has two integral extended portions 12 and 14. The curvature of the semi-circular section terminates at junctions 12a and 14a, respectively, where the extended portions 12 and 14 laterally extend from the holding portion 16. As can be seen in FIG. 1, the extended portions constitute arms 12b and 14b, that extend substantially the length of the bracket 10. In the bracket 10, there is no portion where more than two metal plates are stacked. The bracket 10 is made by pressing only one thin flat metal plate. Thus, the bracket 10 can be made lightweight and at a low cost.

Incidentally, as shown in FIG. 1, the bracket 10 is fixed to a bottom portion of a shock absorber 18. The bracket 10 and the shock absorber 18 are connected by welding together the bracket 10 and the absorber shell 18a at the upper edge 16a of a holding portion 16 and at the lower edge 16b of the holding portion 16. The shock absorber 18 has a lower cap 20. The lower cap 20 is fixed to the absorber shell 18a at a lower edge thereof to seal the interior of the shock absorber 18. The cap 20 is ordinarily fixed to the absorber shell 18a by welding along the periphery thereof.

Thus, to correctly assemble the shock absorber 18 and to fix the bracket 10 to the shock absorber 18, it is necessary to do two Welding operations near the lower edge of the absorber shell 18a. Accordingly, if it is possible to weld the lower edge of the absorber shell 18a, the lower cap 20 and the lower edge of the bracket 10 together at the same time, a higher volume of production can be obtained.

However, the lower cap 20 must be continuously welded along the periphery thereof. On the other hand, it is not possible to continuously weld the bracket 10 around the absorber shell 18a, because the holding portion 16 is not formed in such a way to continuously surround the absorber shell 18a. Therefore, to weld the absorber shell 18a, the lower cap 20 and the bracket 10 together, it is necessary to sequentially weld the portion where the bracket 10 exists exteriorly of the absorber shell 18a and the portion where the bracket 10 does not exist exteriorly of the absorber shell 18a.

To do the above welding, it is necessary to change welding conditions, such as welding current, welding speed and angle of the welding torch in the middle of the welding process. Therefore, it is complicated to weld the absorber shell 18a, the lower cap 20 and the bracket 10 together at the same time. Therefore, the conventional bracket 10 does not provide a structural arrangement which permits a high production volume and low cost.

SUMMARY OF THE INVENTION

It is a general object of the present invention to provide a novel and useful bracket for a strut of a vehicle suspension, a novel and useful connecting structure thereof, and a novel and useful connecting method for such a bracket and a shock absorber.

A more specific object of the present invention is to provide a bracket for a strut of a suspension which permits a high production volume.

A further object of the present invention is to provide a connecting structure for a strut of a suspension by which a bracket can be easily fixed to the strut.

A further object of the present invention is to provide a suspension for an automobile using such a bracket which provides a high production volume.

A further object of the present invention is to provide a connecting method of such a bracket and a shock absorber by which the connection of the bracket and the shock absorber is easily carried out.

The above-mentioned objects of the present invention are achieved by a bracket made from a thin flat metal plate for connecting a strut of a suspension and a wheel carrier comprising at least two attaching portions attached to the wheel carrier; a holding portion holding the strut at a predetermined position; and at least one welding portion substantially completely surrounding the predetermined position of the strut and welded to the strut.

According to the present invention, the strut held by the bracket is surrounded almost completely by the welding portion. Thus, the welding of the strut and the bracket can be carried out without changing any welding conditions. Moreover the bracket is made from a thin flat metal plate. Therefore, the bracket of the present invention is very useful to form a good quality welding portion easily and to obtain a high production.

The bracket of the present invention is made by a process of forming, from a sheet of plate metal material, a one piece bracket that is lightweight and reduces the welding process steps necessary for attachment to a strut or shock absorber of a vehicle suspension system. In the forming process, the bracket is provided with cut-off sections to reduce weight. Further, the bracket is formed to provide welding portions that permit ease of assembly to the strut or shock absorber used in the vehicle suspension system.

The above-mentioned objects of the present invention are also achieved by a connecting structure of a strut of a vehicle suspension comprising a bracket made from a thin flat metal plate and including at least two attaching portions attached to a wheel carrier, a holding portion holding the strut at a predetermined position and at least one welding portion substantially completely surrounding the predetermined position of the strut; and the strut welded with the welding portion at an end of the strut.

According to the present invention, the welding of the strut and the bracket can be carried out without changing any welding conditions. Therefore, the connecting structure of a strut and a suspension is very useful for easily fixing the bracket to the strut.

The above-mentioned objects of the present invention are also achieved by a suspension for an automobile including a strut connecting a wheel carrier and a body of the automobile comprising a bracket made from a thin flat metal plate and comprising at least two attaching portions being attached to the wheel carrier, a holding portion holding a predetermined position of a strut and at least one welding portion almost completely surrounding a predetermined position of a strut, and a strut being welded together with the welding portion at the edge thereof.

According to the present invention, it is possible to weld the bracket and the strut together appropriately without carrying out any complex controls. Therefore, the suspension of the present invention is very useful for providing a high production volume.

The above-mentioned objects of the present invention are also achieved by a method of connecting a bracket and a shock absorber having a cap at the edge thereof comprising a step for assembling a cap to the edge of said shock absorber; a step for assembling a bracket made from a thin flat metal plate and having at least one welding portion almost completely surrounding a shock absorber so that the welding portion is in contact with the edge of the shock absorber; and a step of welding the cap, the welding portion and the edge of the shock absorber together.

According to the present invention, it is possible to weld the cap, the bracket and the shock absorber together by the same welding process. According to the present invention, it is possible to easily provide a good quality to the weld formed around the shock absorber. Therefor, the connecting method of the present invention is very useful for providing both a high production volume and a good quality weld of the bracket and a shock absorber.

Other objects, features and advantages of the present invention will become more apparent from the following detailed description when read in conjunction with the accompanying drawings.

BRIEF DESCRIPTION OF THE DRAWINGS

FIG. 7 is a front view of a bracket according to an embodiment of the present invention and a lower edge portion of a shock absorber;

FIG. 8 is a side view of a bracket according to an embodiment of the present invention and a lower edge portion of a shock absorber;

DESCRIPTION OF THE PREFERRED EMBODIMENTS

Figure 5:
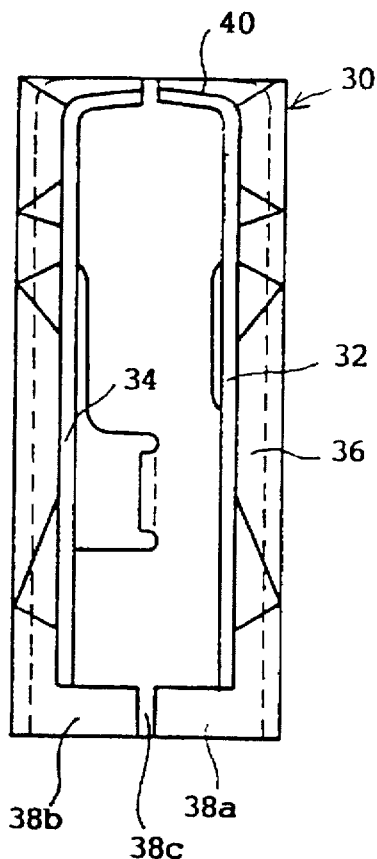
FIG. 5 is a side view of a bracket according to an embodiment of the present invention.
Figure 3:
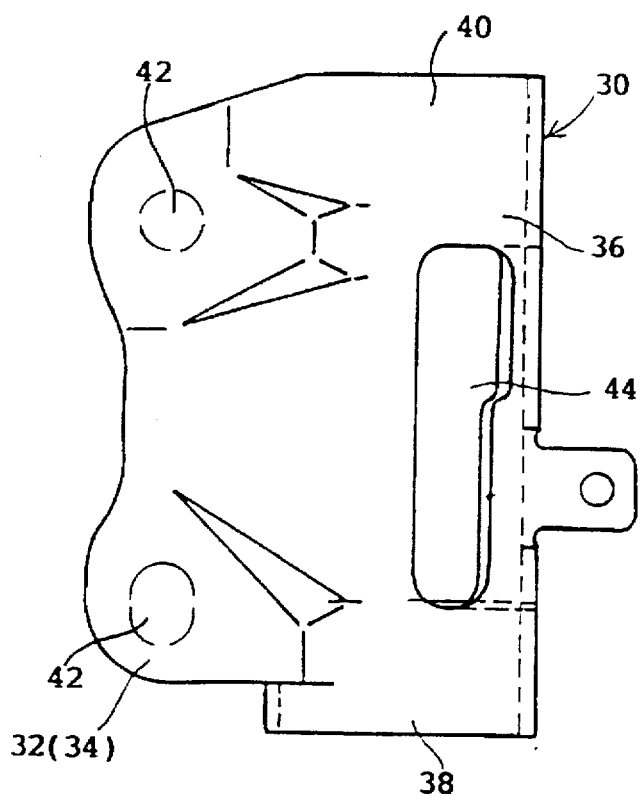
FIG. 3 is a front view of a bracket according to an embodiment of the present invention.
Figure 4:
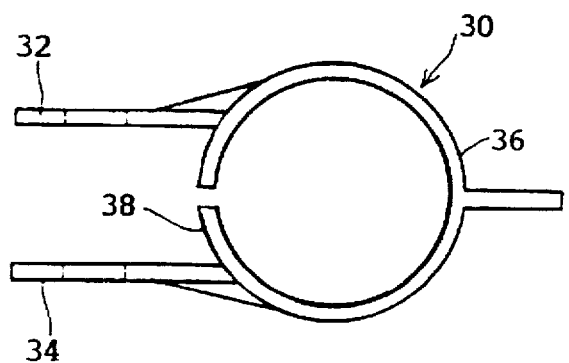
FIG. 4 is a bottom view of a bracket according to an embodiment of the present invention.

A description will be given, with reference to FIG. 3 through FIG. 5, of a bracket for a strut of a suspension according to an embodiment of the present invention. FIG. 3 shows a front view of a bracket 30 according to the embodiment of the present invention. FIG. 4 shows a bottom view of the bracket 30. FIG. 5 shows a side view of the bracket 30.

The bracket 30 is made from a thin flat metal plate. As shown in FIG. 3 through FIG. 5, the bracket 30 has two attaching portions 32, 34 which provides for attachment to a wheel carrier, a holding portion 36 which holds an absorber shell of a shock absorber and a lower and an upper welding portions 38, 40 which are welded to the absorber shell.

The attaching portions 32, 34 are made from side portions of a thin flat metal plate and have bolt holes 42, respectively. The bracket 30 is bolted to a wheel carrier using the bolt holes 42. The bolting process of the bracket 30 is carried out when a predetermined portion of the wheel carrier is placed between the attaching portions 32, 34. Thus, the attaching portions 32, 34 are formed so that a predetermined distance is provided between the attaching portions 32, 34.

The holding portion 36 is defined by a middle section of the bracket and is formed to fit the configuration the absorber shell. As shown in FIG. 5, the holding portion 36 does not completely surround an absorber shell because of the predetermined space existing between the attaching portions 32, 34, namely between both edges of the holding portion 36. Also, the holding portion 36 has a pressed-out portion 44. The pressed-out portion 44 permits the bracket 30 to be lighter weight.

The lower welding portions 38 is formed on the lower edge of the holding portion 36 and the upper welding portion 40 is formed on the upper edge of the holding portion 36. The lower and the upper welding portions 38, 40 are formed in a ring shape having a predetermined width and a slit so that they can substantially completely surround an absorber shell. For obtaining enough connecting strength between the bracket 30 and a wheel carrier, it is not necessary that the length of the attaching portions 32, 34 and the length of the portion where the bracket 30 holds an absorber shell to be the same length. Thus, with regard to the bracket 30, the attaching portions 32, 34 are designed to be shorter than the overall length of the bracket 30. In the manufacturing process of the bracket 30, the lower and the upper welding portions 38, 40 are formed by curving the upper portion and the lower portion of the thin flat metal plate into a ring-shape having a predetermined diameter.

Figure 1:
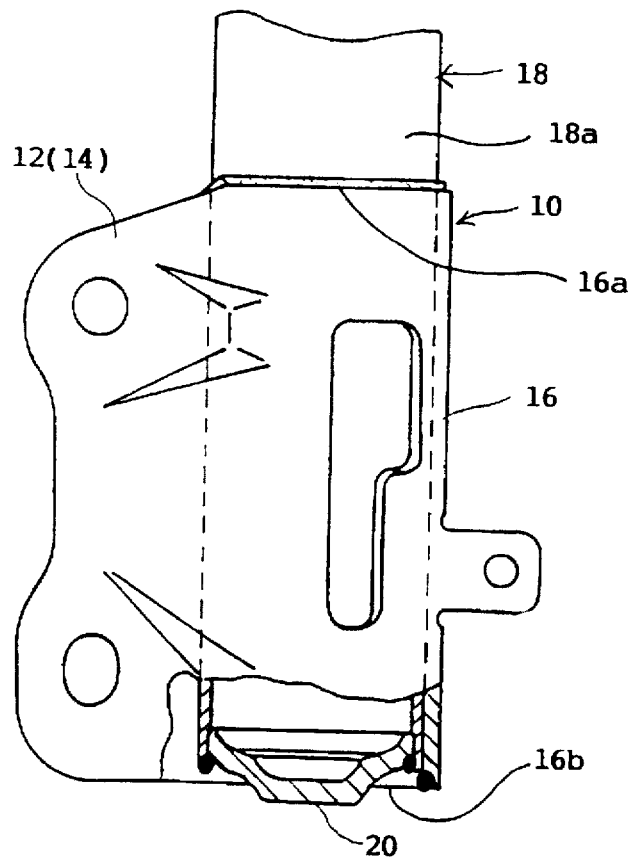
FIG. 1 is a front view of a bracket of the prior art and a lower edge portion of a shock absorber.
Figure 2:
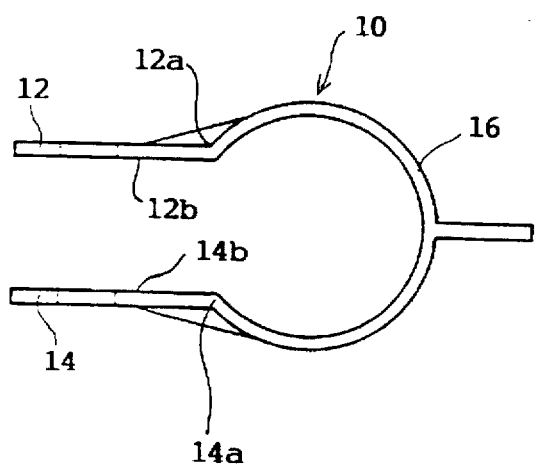
FIG. 2 is a bottom view of a bracket of the prior art.

The bracket 30 is provided with holding portion 36 having, along a portion of its length, a configuration somewhat similar to FIG. 2. That is, a semi-circular portion having laterally extending arms. However, as discussed with respect to FIG. 4, the semicircular portion 36 is provided with an integral section 38 used for attachment, i.e., welding, to the strut or shock absorber. The welding portion 38a and 38b are extensions of the semi-circular holding portion 36. The portions 38a and 38b extend, in a circular direction, almost far enough to form a circular cylinder. That is, in combination with the holding portion 36, the extensions almost meet so as to form a cylindrical metal ring. Hence, there is only a small gap 38c between the welding portions 38a and 38b. Accordingly, there is provided a substantially exact fit of the bracket 30 so as to surround the strut or shock absorber of the suspension system. As shown by FIG. 3 through FIG. 5, the attaching portions 32 and 34 laterally extend from the bracket 30 in a manner similar to that of the bracket 10; however, the attaching portions 32 and 34 do not extend the full length of the bracket 30 in the manner of the bracket 10 of the prior art. This is because the welding portions 38a and 38b are clearly exposed so as to permit the easy attachment, by welding, of the bracket 30 to the strut or shock absorber of the vehicle suspension system. The upper welding portion 40 is formed in a similar manner as that of the lower welding portion 38. Therefore, the description of the upper welding portion lo has been omitted.

According to the above structure, the bracket 30 which has the attaching portions 32, 34, the holding portion 36 and the lower and the upper welding portions 38, 40 is easily made from a thin flat metal plate. Therefore, the bracket 30 can be easily manufactured with a high volume of production.

Figure 6:
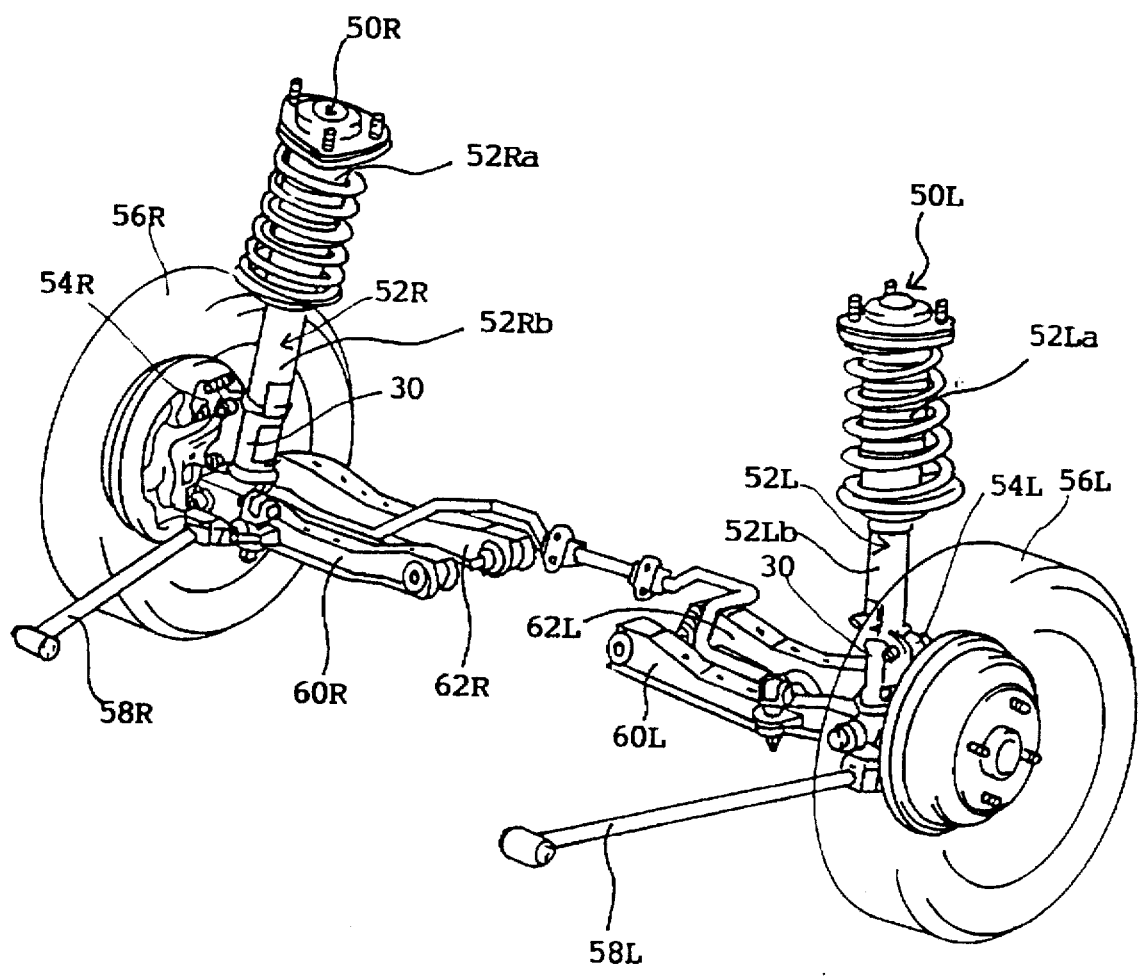
FIG. 6 is a perspective view of a suspension of an automobile according to an embodiment of the present invention.

A description will be given, with reference to FIG. 6 through FIG. 8, of a suspension for an automobile according to an embodiment of the present invention. FIG. 6 shows a perspective view of a left suspension 50L and a right suspension 50R of an automobile.

The suspensions 50L and 50R shown in FIG. 6, respectively, use the bracket 30 to connect a shock absorber 52L, 52R and a wheel carrier 54L, 54R. The shock absorber 52L, 52R has a cylinder 52La, 52Ra and an absorber shell 52Lb, 52Rb which has a piston rod interiorly thereof. The cylinders 52La, 52Ra are bolted on a body of an automobile. The piston rods placed in the absorber shell 52Lb, 52Rb can move to an axial direction thereof along with the inner wall of the cylinder 52La, 52Ra. Thus, the cylinder 52La, 52Ra and the absorber shell 52Lb, 52Rb are relatively movable when a force directed in the axial direction of the absorber shell 52Lb, 52Rb is exerted on the absorber shell 52Lb, 52Rb.

The brackets 30 and the absorber shell 52Lb, 52Rb are welded together at the lower edge portions of the absorber shell 52Lb, 52Rb: The brackets 30 are bolted on the wheel carrier 54L, 54R. The wheel carrier 54L supports a left wheel 56L, and the wheel carrier 54R supports right wheel 56R.

The wheel carrier 54L, 54R is connected with suspension arms 58L, 58R; 60L, 60R; and 62L, 62R. The suspension arms 58L, 58R; 60L, 60R; and 62L, 62R are connected with a body portion of an automobile. These connections are made so that the wheel carrier 54L, 54R and the body portion of the automobile can move relative to each other.

Therefore, during operating conditions of the automobile, when vibrations are input to the left or right wheel 56L, 56R, the vibrations are absorbed by up and down movements of the left and right wheels 56L and 56R in accordance with expansions and contractions of the shock absorbers 52L, 52R.

As described above, the bracket 30 is fixed to the shock absorbers 52L, 52R by welding the bracket 30 and the absorber shells 52Lb, 52Rb together. A description of the fixed portion will be given hereinafter, with reference to FIG. 7 and FIG. 8. FIG. 7 shows a front view of the bracket 30 and the lower portion of the absorber shell 52Lb. FIG. 8 shows a side view of the bracket 30 and the absorber shell 52Lb.

As shown in FIG. 7, the shock absorber 52L has a lower cap 52Lc at the lower end thereof. The lower cap 52Lc is welded around the periphery thereof at the bottom of the absorber shell 52Lb in order to seal the interior of the shock absorber 52L. In the present embodiment, the bottom of the absorber shell 52Lb is placed in the middle of the lower welding portion 38 of the bracket 30. Thus, the welded portion of the absorber shell 52Lb and the lower cap 52Lc are positioned in the middle of the lower welding portion 38 when the bracket 30 is assembled to the shock absorber 52L in the correct position.

The shock absorber 52L and the bracket 30 are supplied to a final assembling process after they are welded together. Thus, both of the welding processes for fixing the lower cap 52Lc to the absorber shell 52Lb and for fixing the bracket 30 to the absorber shell 52Lb are carried out before they are forwarded to the final assembling process.

Therefore, the welding process for fixing the bracket 30 and the absorber shell 52Lb are carried out during the manufacturing process of the shock absorber 52L. To manufacture the shock absorber 52L fixed to the bracket 30 efficiently, it is most effective to weld the absorber shell 52Lb, the lower cap 52Lc and the bracket 30 during the same welding process.

In a situation in which a bracket does not substantially completely surround the absorber shell 52Lb, a portion where the bracket exists exteriorly of the absorber shell 52L and a portion where the bracket does not exist exteriorly of the absorber shell 52L are formed around the lower cap 52Lc. In this situation, it is required to change welding conditions, such as welding current, welding speed and angle of the welding torch in the middle of the above welding process. Thus, in the above situation, it is not easy to form a good quality welded portion all around the absorber shell 52Lb.

On the other hand, in the present invention in which the bracket 80 substantially completely surrounds the absorber shell 52Lb, the welding process for welding the absorber shell 52Lb, the lower cap 52Lc and the bracket 30 to each other can be carried out without changing any welding conditions. Thus, the bracket 30 of the present invention, provides for easy formation of a high quality weld all around the absorber shell 52Lb.

As described above, the bracket 30 can be manufactured easily from a thin flat metal plate. Using the bracket 30, the welding for fixing the lower cap 52Lc to the absorber shell 52Lb and fixing the bracket to the lower edge of the absorber shell 52Lb can be easily carried out. Thus, by use of the bracket 30, it is possible, with respect to the suspension 50L, 50R of an automobile, to provide high production volume, light weight, and reduced manufacturing cost.

The present invention is not limited to the specifically disclosed embodiments. Thus, variations and modifications may be made without departing from the scope of the present invention.

What is claimed is:

1. A bracket assembly in combination with a strut of a suspension and a wheel carrier, said bracket assembly comprising:

a bracket and a welding bead; and said bracket formed from a thin flat metal plate and comprising:

a holding portion for holding the strut;

at least two attaching portions extending directly from said holding portion for attaching said bracket to the wheel carrier; and at least one welding portion for surrounding and conforming to the strut at a predetermined position of the strut, such that said at least one welding portion is welded in a circular direction to the strut at said predetermined position;

said welding bead substantially surrounding said strut, welding said strut at a substantially whole circumference thereof to said at least one welding portion and being formed under completely constant welding conditions.

2. The bracket assembly as claimed in claim 1, wherein said strut comprises a shock absorber.

3. The bracket assembly as claimed in claim 1, wherein:

said at least two attaching portions are extensions of side portions of said thin flat metal plate;

said holding portion is located between said attaching portions; and said at least one welding portion is located at an edge of said holding portion.

4. The bracket assembly as claimed in claim 3, wherein said at least one welding portion is displaced from said at least two attaching portions in an axial direction of said bracket.

5. The bracket assembly as claimed in claim 3, wherein said strut comprises a shock absorber.

6. The bracket assembly as claimed in claim 5, wherein said at least one welding portion is formed so that said at least one welding portion is in contact with an end of said shock absorber when said bracket and said shock absorber are correctly assembled.

7. The bracket assembly as claimed in claim 1, wherein said at least two attaching portions have a length extending in an axial direction of said bracket, said length being less than an axial length of said bracket.

8. The bracket assembly as claimed in claim 7, wherein:

said axial length of said bracket is a sum of said length of said at least two attaching portions plus said at least one welding portion; and said at least two attaching portions and said at least one welding portion are integral.

9. The bracket assembly as claimed in claim 1, wherein:

two welding portions are provided which are integral with said at least two attaching portions and said holding portion; and said two welding portions are separated by a gap therebetween.

10. The bracket assembly as claimed in claim 9, wherein said gap is of a width which is substantially less than a circumferential distance of a sum defined by said two welding portions and said holding portion.

11. The bracket assembly as claimed in claim 1, further comprising at least one pressed-out portion extending in a lengthwise direction of said bracket.

12. The bracket assembly as claimed in claim 1, wherein said at least one welding portion comprises a portion for surrounding an end of the strut.

13. A connecting structure in combination with a strut of a vehicle suspension comprising:

a bracket formed from a thin metal plate, said bracket comprising a holding portion for holding the strut, at least two attaching portions extending directly from said holding portion for attaching said bracket to a wheel carrier and at least one welding portion for surrounding and conforming to an end of the strut such that the at least one welding portion is completely welded in a circular direction to the strut when the strut is located at a predetermined position;

said connecting structure further comprising a welding bead substantially surrounding said strut, welding said strut at a substantially whole circumference thereof to said at least one welding portion and being formed under substantially constant welding conditions.

14. The connecting structure as claimed in claim 13, wherein said strut comprises a shock absorber.

15. The connecting structure as claimed in claim 14, wherein:

said shock absorber comprises a cap at an edge thereof; and said bracket and said cap are fixed to said shock absorber by said at least one welding portion that comprises a common welding portion.

16. A suspension for an automobile in combination with a strut and a wheel carrier comprising:

a bracket formed from a thin metal plate, said bracket comprising a holding portion for holding the strut, at least two attaching portions extending directly from said holding portion for attaching said bracket to said wheel carrier and at least one welding portion for surrounding and conforming to an end of said strut, such that the at least one welding portion can be completely welded in a circular direction to the strut when the strut is located at a predetermined position;

said suspension further comprising a welding bead substantially surrounding said strut, welding said strut at a substantially whole circumference thereof to said at least one welding portion and being formed under substantially constant welding conditions.

17. The suspension for an automobile as claimed in claim 16, wherein said strut comprises a shock absorber.

18. The suspension for an automobile as claimed in claim 17, wherein:

said shock absorber comprises a cap at the end thereof; and said bracket and said cap are fixed to said shock absorber by said at least one welding portion that comprises a common welding portion.

* * * * *

UNITED STATES PATENT AND TRADEMARK OFFICE
CERTIFICATE OF CORRECTION

PATENT NO. : 5,669,728
DATED : September 23, 1997
INVENTOR(S) : Hiroyuki KOBA

It is certified that error appears in the above-indentified patent and that said Letters Patent is hereby corrected as shown below:

On the title page, in item [73], change "Jidosh" to --Jidosha--.

Signed and Sealed this

Second Day of December, 1997

*Attest:*

BRUCE LEHMAN

*Attesting Officer*                *Commissioner of Patents and Trademarks*